United States Patent [19]

Mehta et al.

[11] Patent Number: 4,730,093

[45] Date of Patent: Mar. 8, 1988

[54] METHOD AND APPARATUS FOR REPAIRING METAL IN AN ARTICLE

[75] Inventors: Paul P. Mehta, Fairfield; Robert R. Otten; Ernest B. Cooper, Jr., both of Cincinnati, all of Ohio

[73] Assignee: General Electric Company, Cincinnati, Ohio

[21] Appl. No.: 15,412

[22] Filed: Feb. 17, 1987

Related U.S. Application Data

[62] Division of Ser. No. 655,775, Oct. 1, 1984.

[51] Int. Cl.$^4$ ............................................. B23K 26/00
[52] U.S. Cl. ........................ 219/121 LC; 219/121 FS; 219/121 LE; 222/146.5
[58] Field of Search ............... 219/121 LC, 121 LD, 219/121 LE, 121 LF, 121 FS; 222/146.1, 146.5, 146.6, 385, 354, 349, 226, 195, 196

[56] References Cited

U.S. PATENT DOCUMENTS

| | | | |
|---|---|---|---|
| 2,800,252 | 7/1957 | Wahl | 222/196 X |
| 4,067,150 | 1/1978 | Merrigan | 222/196 X |
| 4,218,494 | 8/1980 | Belmondo et al. | 219/121 LD X |
| 4,243,867 | 1/1981 | Earle et al. | 219/121 LE X |
| 4,256,950 | 3/1981 | Wildgruber | 222/146.5 X |
| 4,270,675 | 6/1981 | Wicks et al. | 222/196 |
| 4,299,860 | 11/1981 | Schaefer et al. | 219/121 LE X |
| 4,300,474 | 11/1981 | Livsey | 219/121 LE X |
| 4,323,756 | 4/1982 | Brown et al. | 219/121 LM X |
| 4,472,091 | 9/1984 | Callahan | 222/196 X |

FOREIGN PATENT DOCUMENTS 0012159 3/1985 Japan .......................... 219/121 LD Primary Examiner—C. L. Albritton
Attorney, Agent, or Firm—Derek P. Lawrence

[57] ABSTRACT

In the repair of a metallic article portion, a metal powder and laser beam are applied concurrently, the laser beam being applied in a power density range of $10^4$ to $10^6$ watts per square centimeter at an interaction time between the laser and the article and powder of 0.005-2 seconds to generate a repair layer.

Apparatus for delivering a consistent, continuous flow of powder comprises the combination of an enclosed powder reservoir including means to introduce a gas under pressure, a mechanical means to feed powder into a conduit, a conduit vibrating means, and a fluid-cooled powder delivery nozzle.

3 Claims, 5 Drawing Figures

METHOD AND APPARATUS FOR REPAIRING METAL IN AN ARTICLE

This is a division of application Ser. No. 655,775, filed Oct. 1, 1984.

This invention relates to the repair of a metallic portion of an article and, more particularly, to such a repair using a metal powder and a laser beam.

BACKGROUND OF THE INVENTION

Modern gas turbine engines, particularly of the type designed primarily for aircraft applications, include components which are expensive to manufacture because of their complex design and materials of construction. During normal operation of such apparatus, some components can experience events such as normal wear or thermal damage. In addition, mishaps such as machining errors or other inadvertent damage can occur during initial manufacture. For example, such events or damage can occur in connection with compressor or turbine spools or disks.

It has been found that, in respect to localized repair of a portion of an article rather than replacement of the portion, ordinary known means of repair such as electron beam welding and gas tungsten arc welding can adversely affect properties of the material of construction because of relatively high heat input which results in distortion and a relatively deep heat affected zone. Such an excessive heat distribution has been found to cause component cracking which is particularly critical in rotating components such as wheels, drums, and spools of gas turbine engines.

SUMMARY OF THE INVENTION

It is a principal object of the present invention to provide an improved method for repairing a damaged metallic portion of an article to recreate its original configuration and material while reducing adverse effects on the article resulting from the method by limiting the extent of the heat affected zone.

Another object is to provide such a repair method which combines the use of metal repair powder of substantially the same composition as a metal portion of an article and a laser beam for the consolidation of a repair layer or plurality of superimposed repair layers on the article.

Still another object is to provide apparatus of components which in combination provide a consistent continuous powder flow to enable practice of the repair method.

These and other objects and advantages will be more fully understood from the following detailed drawing, description, and examples, all of which are intended to be representative of, rather than in any way limiting on, the scope of the present invention.

Briefly, one form of the method of the present invention for repairing an article having an article portion of a metallic material includes the steps of concurrently applying to the article portion a metal powder, alone or in combination with another powder such as an abrasive, and a laser beam. The metal powder is of a composition substantially the same as that of the metallic material of the article portion and preferably is applied at a rate in the range about 2-15 grams per minute. The laser is applied, in a laser beam spot, to the powder and the article portion beneath the powder within a power density range of $10^4$ to $10^6$ watts per square centimeter to generate a molten interaction zone from the metal powder and the metallic material of the article portion. In order to further control the resultant heat affected zone, an interaction time is maintained in the range of 0.005-2 seconds between the laser beam spot and the powder along with the article portion beneath the powder, for example by relative lateral movement, to enable progressive movement, cooling, and solidification of the molten interaction zone. This controls and reduces the extent of the heat affected zone in the article portion and provides a repair layer on the article portion consolidated from the applied powder and metallic material of the portion. Other forms of the invention contemplate repeating such steps, if desired, to provide a plurality of superimposed, bonded-together repair layers using the preceding repair layer as the "article portion" for the concurrent application of metal powder and laser beam.

One form of the apparatus of the present invention comprises a unique combination of components including an enclosed, preferably heated powder reservoir, means to introduce inert gas under pressure into the reservoir, a mechanical volumetric powder feed means, a powder vibrator, and a fluid-cooled delivery nozzle. Together, such components deliver a consistent, continuous flow of powder.

DESCRIPTION OF THE PREFERRED EMBODIMENTS

In the initial manufacture as well as in the operation of aircraft gas turbine engine components, damage from manufacturing error as well as from operational thermal cycling, wear, part interference, etc. can occur. Because of the relative high cost of such components, there are many potential benefits which can be obtained by their repair rather than their replacement. Athough such damage can occur to stationary as well as rotating parts, damage is particularly critical in the rotating components because of the stresses generated in operation, during rotation. Because damaged portions of components can be relatively thin, known methods of repair, for example to build up undersized portions, can produce heat affected zones inordinately large and detrimental to the operation capability of the component.

An example of one gas turbine engine component with which the present invention has been used is a compressor rotor including a plurality of disk-type members disposed radially inwardly from a drum or spool surface. One such compressor rotor is shown in U.S. Pat. No. 3,765,795, issued Oct. 16, 1973, and assigned to the assignee of the present invention. A portion of such a spool is shown in the fragmentary, partially sectional, diagrammatic view of FIG. 1 including a four-stage segment of a larger compressor rotor joined such as through bolting to an adjacent member.

Figure 1:
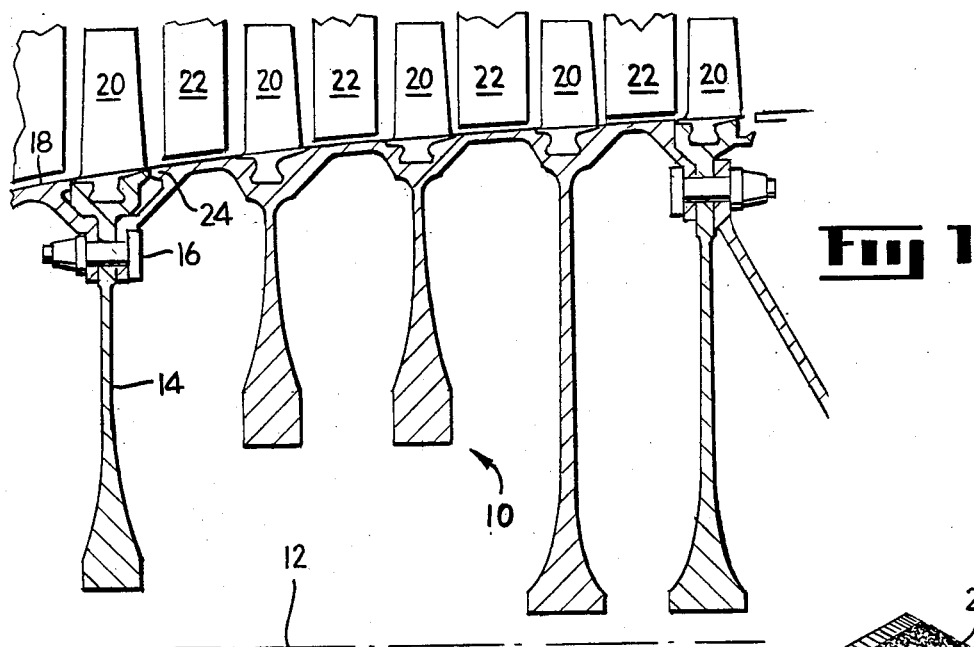
FIG. 1 is a fragmentary, partially sectional, diagrammatic view of a portion of a compressor spool with which the present invention can be used.

With reference to FIG. 1, such a spool or drum member is shown generally at 10 as comprising four disk portions having a central opening and disposed for rotation about engine axis 12. Drum or spool 10 is joined to adjacent rotating member 14 through bolt means 16 which also connects member 14 to an adjacent spool 18. Rotating drum 10 and member 14 carry rotating blading members 20 which cooperate with stator vanes 22, as is well known in the axial flow compressor art.

Figure 2:
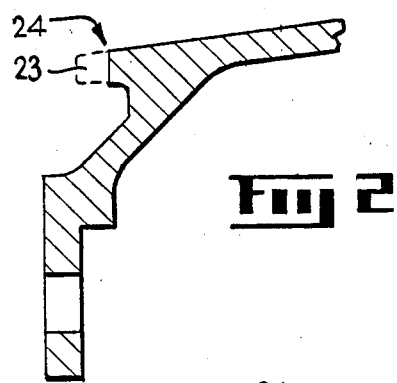
FIG. 2 is an enlarged fragmentary portion of spool 10 of FIG. 1.

In respect of the present invention, a lip portion 24 of spool 10, enlarged in FIG. 2, cooperates with an adjacent portion of member 14 during operation. Portion 24 can be subject to operation damage such as through wear, erosion, thermal fatigue, etc. Enlarged FIG. 2 showing an end portion of spool 10 which includes lip 24 shows, in phantom, material 23 worn from lip 24. Because it is desired in such a component to maintain a smooth airflow therethrough and minimize leakage, excessive clearances generated by such damage can affect performance of the component. As can be appreciated from the complexity of the structure involved, it is far more attractive to repair rather than to replace such a member. However, because of the relatively thin sectional area involved, ordinary repair methods have been found to be undesirable and detrimental to the metal from which the member has been constructed.

Figure 4:
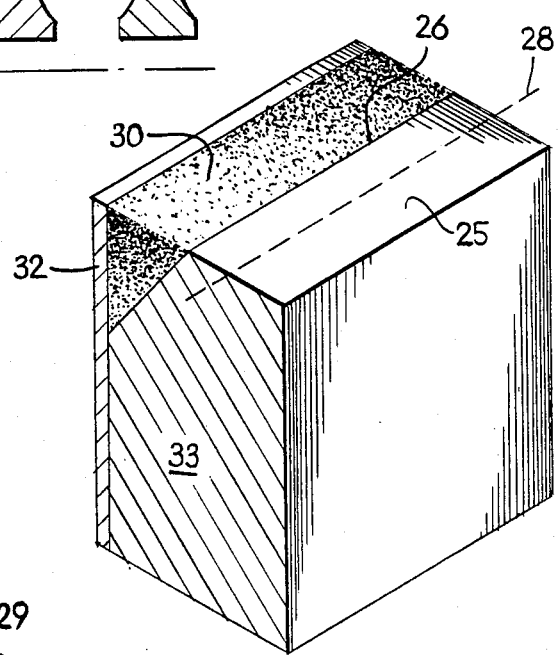
FIGS. 3 and 4 are forms of specimens used in the evaluation of the present invention.
Figure 3:
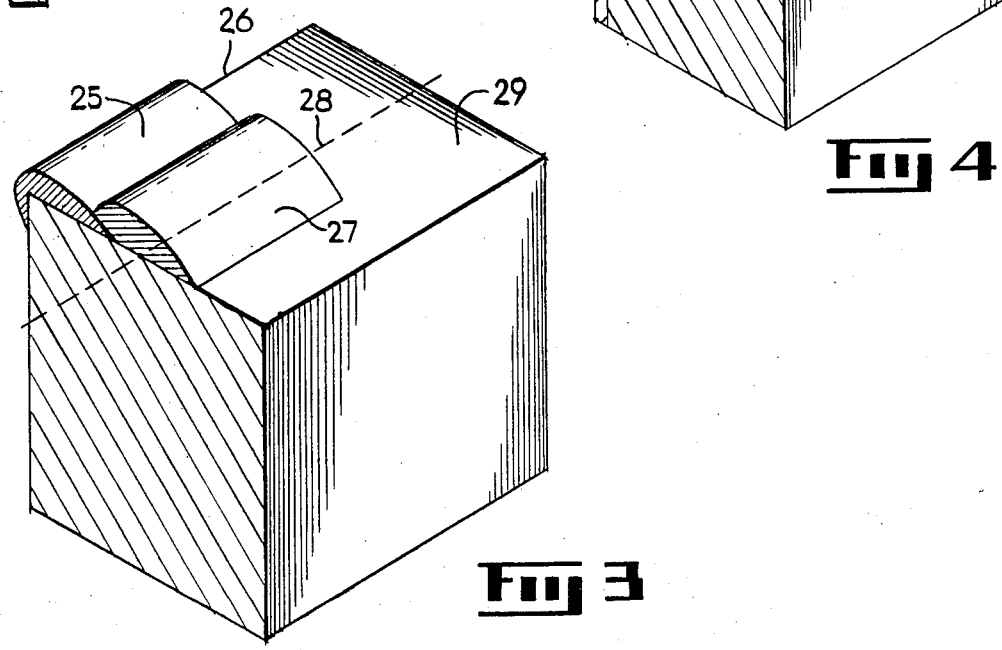

During the evaluation of the present invention, a variety of specimens were prepared including those of the types shown in FIGS. 3 and 4. Such specimens were intended to evaluate the effect of a laser beam in melting powder to be consolidated with a substrate or a metallic material of an article portion. The object of such consolidation and rebuilding, sometimes called "Reverse Machining" method, is to provide a repair layer or layers of the same material as that from which the article was made, while minimizing the heat affected zone as an undesirable result of any such method. In general, the heat affected zone is that portion of the material of an article which has experienced relatively high localized heat, for example as in brazing, welding, and other types of processes, including repair processes, in which heat energy is applied to a material surface. As the result of such application of heat, the mechanical properties of the material can be significantly reduced, sometimes to the point at which the article is no longer suitable for its intended purpose without some subsequent restrengthening procedure. Because of the complexity of an article such as the compressor rotor portion shown in FIG. 1, it is not economically attractive to restrengthen the member after a repair process which generates an inordinately large heat affected zone, particularly in such a highly stressed member.

During the evaluation of the present invention, coupons shown in the perspective, partially sectional views of FIGS. 3 and 4 were used. Test repair layers 25 and 27 in FIG. 3, of approximately 1.5 inches in length, were deposited along the top surface 29 of the specimen. In one series of tests, metal powder and the laser beam spot were applied concurrently in two passes made along the test surface: the first in which the central axis of the laser beam spot was at the edge 26 of the specimen in FIG. 3; and the second in which the axis was along a line identified as broken line 28 and 0.065 inches from edge 26.

In these evaluations, the powder feed rate was in the range of about 5–10 grams per minute, within the broad range of 1–30 grams per minute according to the present invention, concurrently with the application of the laser beam from a 5000 watt continuous wave $CO_2$ laser manufactured by Spectra Physics as Model 975 and maintained at a power setting of 1.8–2.0 kilowatts which corresponds to power densities in the range of $3.5-3.9 \times 10^4$ watts per square centimeter. The beam spot size was in the range of 0.05–0.15 inches. In these examples, a molten interaction zone was created from the metal powder and the metallic material of the coupon described above. The coupons were made from a nickel base alloy commercially available as IN718 alloy and the powder was IN718 alloy having a composition substantially the same as that of the coupon material.

In all tests in which the first pass laser beam axis was at edge 26, an internal or interdendritic crack occurred in the repair layer. However, in other tests using the same materials and apparatus and in which the location of the axis of the laser beam spot in the first pass was moved about 0.01–0.02" (nominally 0.15") away from edge 26, no such cracks were observed. Therefore, the method of the present invention recognizes that in the method of repairing an article portion including an edge of the article, it is critical to direct the central axis of a laser beam spot away from the edge of the article in order to avoid cracking of the repair layer deposits. In the evaluation in which the first pass beam spot axis was away from the edge of the article, three vertical layers, each including two side-by-side passes as described above and displaced 0.06 inches, did not result in cracking of the deposit. Therefore, a plurality of repair layers can be superimposed one upon the other according to the method of the present invention without generating cracks in the deposit upon cooling. As used herein, the designation "edge of an article" means the intersection of surfaces or planes which, when examined in planar cross section, results in an abrupt change in angle. For example, an edge of the article can be a relatively sharp outside corner of a radius of about 0.1 inch or less.

In another series of evaluations, the arrangement shown in FIG. 4 was used. Although the materials and conditions were the same, additional IN718 alloy powder 30 was preplaced in a groove along the side of the coupon. Such groove was defined by the coupon and sheet 32 held with the coupon body 33 as shown in FIG. 4. This was intended to create a more favorable heat transfer condition with the extra powder absorbing photon energy and providing additional protection to the edge from excessive melting. The additional powder 30 can assist in reducing peak temperature by absorbing energy required for melting (heat or fusion).

A further evaluation of the present invention involved a portion of the repair of a gas turbine engine fan blade airfoil interlock surface which had been damaged during manufacture. The blade was made of a titanium alloy commercially available as Ti-6-4 alloy. The powder, employed in the above-described method and apparatus to repair the blade, was −35 mesh titanium powder conforming to Aerospace Material Specification (AMS) 4928H, ELI grade. In this example, the metal powder feed rate, assisted by pressurized argon gas, was 4.5–5.5 grams per minute, with the powder feed nozzle to workpiece at an angle of about 45°–50°. The above-described 5000 watt laser was used in the power range of 3.5–4 kilowatts which corresponds to power densities in the range of $6.9-7.9 \times 10^4$ watts per square centimeter. The beam spot size was about 0.100 inch at an interaction time of about 0.27 seconds. In this example, multiple layers were superimposed on the workpiece surface, as described above, each layer with a powder thickness of about 0.018–0.020 inch with a total weld buildup not exceeding 0.140 inch.

As a result of these tests and evaluations, the power density for practice of the method of the present invention was defined as being in the range of $10^4$ to $10^6$ watts per square centimeter. Below the lower limit, energy is reflected and the beam will not be sufficiently absorbed by the substrate metallic material of the article, leading to lack of fusion or consolidation between the powder and the article substrate material. It is below the threshold required for effective coupling of the beam to the material. In addition, power densities higher than $10^6$ watts per square centimeter can produce excessive vaporization at the article surface and provide a deeper molten zone. From such higher power densities, a wider heat affected zone is created with resultant higher residual stresses between the metallic material of the article portion and the added resolidification cast structure of the repair layer after cooling of the molten zone.

The method of the present invention recognizes the need for controlling the interaction time between the laser beam and the article material with its superimposed powder. Therefore, at the power densities defined for the present invention, it has been recognized that, in a preferred form, an interaction time of 0.1–2 seconds is necessary for such control. Interaction time is defined as a ratio of beam spot size to relative lateral movement between the laser beam spot and the article portion.

It has been recognized that the method of the present invention can be operated an an interaction time of as low as 0.005 second provided that the power density domain is maintained within the range of $10^4$ to $10^6$ watts per square centimeter. The following table presents typical, calculated relationships between laser beam spot size, relative lateral movement represented by table speed, and interaction time, within the scope of the method of the present invention.

TABLE

| SPOT SIZE (inches) | TABLE SPEED (inches per sec.) | INTERACTION TIME (seconds) |
|---|---|---|
| 0.005 | 0.5 | 0.01 |
| 0.200 | 0.5 | 0.4 |
| 0.005 | 0.1 | 0.05 |
| 0.200 | 0.1 | 2.0 |
| 0.005 | 1.0 | 0.005 |
| 0.200 | 1.0 | 0.2 |

Therefore, the method of the present invention minimizes the extent of the heat affected zone resulting from the application of the laser beam to the combination of a powder superimposed on the metallic material of an article portion by defining the limits of the power density and the interaction time: the power density is in the range of $10^4$ to $10^6$ watts per square centimeter in combination with the interaction time in the range of 0.005–2 seconds between the beam spot and the powder and article portion beneath the powder.

Figure 5:
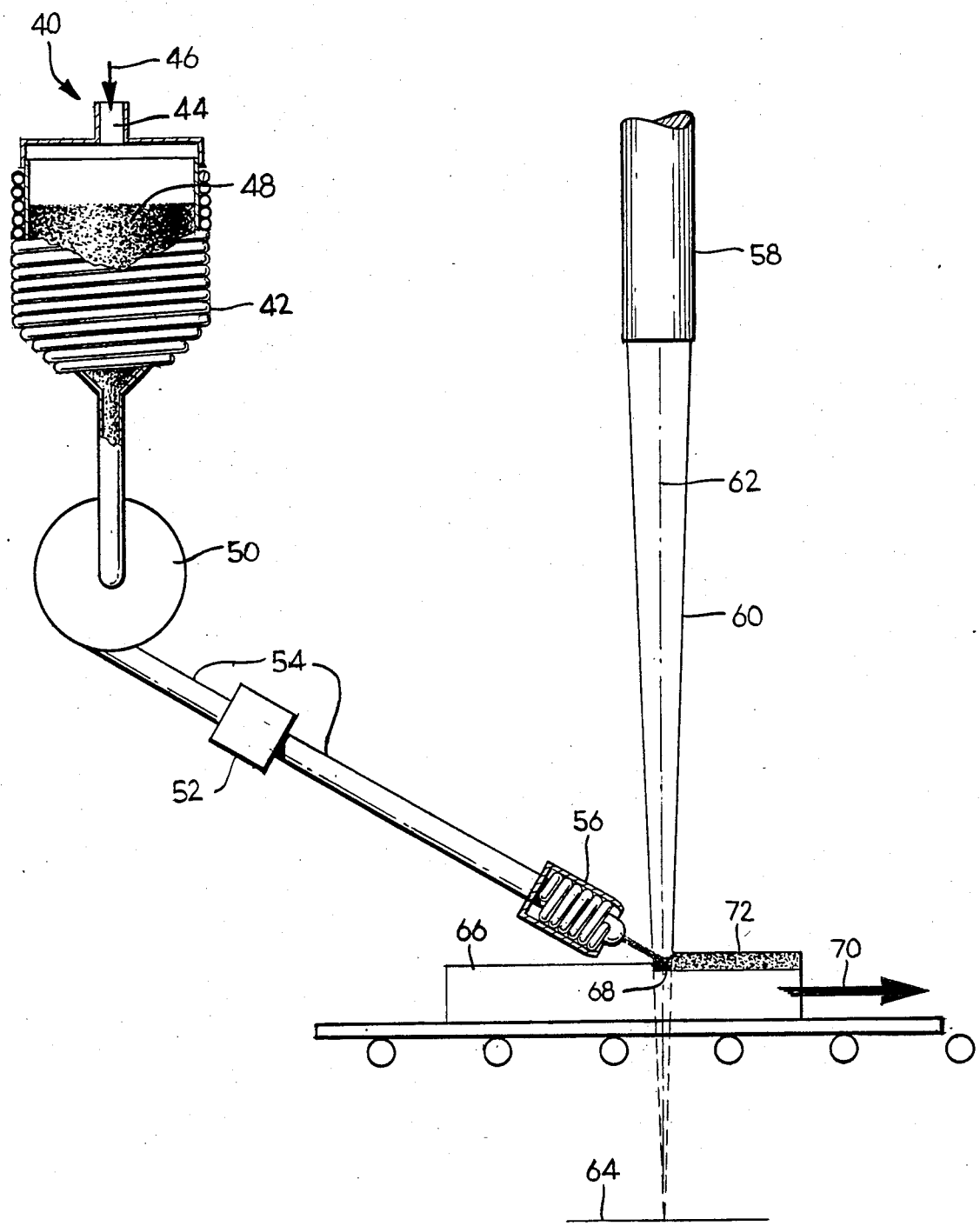
FIG. 5 is a diagrammatic, partially sectional view of the apparatus practicing the method of the present invention.

The apparatus of the present invention and that used in the evaluation of the method is shown in the diagrammatic sectional view of FIG. 5. The apparatus includes an enclosed powder reservoir shown generally at 40, heated by heating coils 42 for the purpose of controlling the moisture content at a low level in the powder. Also included is a gas inlet port 44 through which a preferably dry inert gas such as argon, represented by arrow 46, is introduced to maintain powder 48 in reservoir 40 under pressure and to assist in powder transport. Associated with the powder reservoir is a mechanical, volumetric powder feed mechanism such as powder feed wheel 50 of a type commercially available. For example, the type used in one form of the apparatus of the present invention was a modified Metco powder feed "L" type wheel.

Downstream of wheel 50 is a vibrator such as air actuated vibrator 52 associated with conduit 54 to inhibit powder particles moving in conduit 54 from adhering one to the other or to walls of the conduit 54. Conduit 54 terminates in a water-cooled powder delivery nozzle 56 which directs the powder, assisted by the pressurized inert gas, in a consistent flow, such as toward an article or workpiece surface. It has been found that reflection from the laser beam can result in clogging of powder passing through nozzle 56. Therefore, such a nozzle, preferably having at least a tip portion made of a material, such as copper or aluminum, which is highly reflective to the wave length of the laser used, is fluid cooled, such as by water, to avoid such problem and to assist in a consistent flow of powder. Such consistent flow of powder results from the combination of use of powder maintained in a low moisture condition, under a positive inert gas pressure, being fed by a mechanical, volumetric powder feed mechanism along with a powder vibrator, and a cooled nozzle through which the powder passes toward the article surface in the laser beam spot.

Associated with the apparatus of the present invention is a laser 58 emitting a beam 60 having a beam axis 62. Beam 60 has a focal plane 64 beneath article portion or workpiece surface 66 to provide at the surface a beam spot 68 of a size in the range of 0.005–0.2 inches, and preferably in the range of 0.05–0.15 inches. As was described above, the laser beam was applied in the power density range of $10^4$ to $10^6$ watts per square centimeter while controlling the interaction time between the beam spot and the powder and article portion beneath the powder in the range of 0.005–2 seconds. Such control is obtained by relative lateral motion shown by arrow 70, for example from a table moving the article in the direction shown at a rate to provide the desired interaction time.

The powder is fed from nozzle 56 at an angle in the range of about 35–60 degrees from the article surface and preferably in the range of about 40–55 degrees. Greater than about 60 degrees makes it difficult for the nozzle and powder to avoid premature interaction with the laser beam, and less than about 35 degrees makes it difficult to deliver the powder concurrently with the laser beam at the spot desired on the article surface. As the powder and laser beam are applied concurrently to the article surface, a molten interaction zone is generated in the area of the beam spot. As relative lateral movement is provided between the laser beam spot and the article carrying its superimposed powder, progressive movement, cooling and solidification of the molten interaction zone occurs. This provides consolidated repair layer 72 as shown in FIG. 5. Such a consolidated layer resulting from the practice of the present invention also is shown in phantom at 23 in FIG. 2.

After application and consolidation, excess of the repair layer material added can be shaped to a desired configuration, such as by machining, grinding, dressing of abrasive particles, etc. In this way, there is provided a repaired article having a minimized heat affected zone and desired mechanical properties.

Although the present invention has been described in connection with specific examples and embodiments, it will be understood by those skilled in the arts involved, for example metallurgy, metal joining, and laser technology, that the present invention is capable of modification without departing from its scope as represented by the appended claims.

What is claimed is:

1. Apparatus for delivering a consistent, continuous flow of powder comprising, in combination:

an enclosed powder reservoir;

means to introduce a gas under pressure into the reservoir;

a mechanical, volumetric powder feed means to move powder from the reservoir into a powder conduit;

a conduit vibrating means to vibrate the powder conduit and the powder therein; and a fluid-cooled powder delivery nozzle connected with the powder conduit to receive powder from the conduit for delivery from the nozzle.

2. The apparatus of claim 1 in which the reservoir is heated to maintain low moisture in powder within the reservoir.

3. The apparatus of claim 1 in which the powder delivery nozzle includes at least a tip portion made of a material which is highly reflective to the wave length of a laser used in combination with the apparatus.

* * * * *